(12) United States Patent  
Clifford

(10) Patent No.: US 6,564,642 B1
(45) Date of Patent: May 20, 2003

(54) STABLE DIFFERENTIAL PRESSURE MEASURING SYSTEM

(75) Inventor: Mark J. Clifford, Moorpark, CA (US)

(73) Assignee: Kavlico Corporation, Moorpark, CA (US)

( * ) Notice: Subject to any disclaimer, the term of this patent is extended or adjusted under 35 U.S.C. 154(b) by 0 days.

(21) Appl. No.: 09/704,376

(22) Filed: Nov. 2, 2000

(51) Int. Cl.[7] ................................................ G01L 9/12
(52) U.S. Cl. ............................ 73/718; 73/724; 73/716; 73/736
(58) Field of Search ...................... 73/718, 715, 720, 73/721, 724, 736, 754, 716

(56) References Cited

U.S. PATENT DOCUMENTS

| | | | |
|---|---|---|---|
| 4,023,562 A | | 5/1977 | Hynecek et al. |
| 4,131,088 A | | 12/1978 | Reddy |
| 4,196,382 A | | 4/1980 | Bryzek |
| 4,222,277 A | | 9/1980 | Kurtz et al. |
| 4,287,501 A | * | 9/1981 | Tominaga .................... 73/720 |
| 4,291,293 A | | 9/1981 | Yamada et al. |
| 4,295,115 A | | 10/1981 | Takahashi et al. |
| 4,670,969 A | | 6/1987 | Yamada et al. |
| 4,790,192 A | | 12/1988 | Knecht et al. |
| 4,802,952 A | | 2/1989 | Kobori et al. |
| 4,864,463 A | * | 9/1989 | Shkedi et al. ................. 73/718 |
| 4,895,026 A | * | 1/1990 | Tada ........................... 73/721 |
| 4,975,390 A | | 12/1990 | Fujii et al. |
| 5,193,393 A | | 3/1993 | Czarnocki |
| 5,471,884 A | * | 12/1995 | Czarnocki et al. ............ 73/720 |
| 5,576,251 A | | 11/1996 | Garabedian et al. |
| 5,578,843 A | | 11/1996 | Garabedian et al. |
| 5,591,679 A | | 1/1997 | Jakobsen et al. |
| 5,923,952 A | | 7/1999 | Ismail et al. |
| 5,929,498 A | | 7/1999 | Ismail et al. |
| 5,966,617 A | | 10/1999 | Ismail |
| 6,008,113 A | | 12/1999 | Ismail et al. |
| 6,148,673 A | * | 11/2000 | Brown ........................ 73/721 |
| 6,243,641 B1 | * | 6/2001 | Andrews et al. ............ 701/102 |
| 6,182,501 B1 | * | 2/2002 | Furuse et al. ............... 73/49.2 |

* cited by examiner

Primary Examiner—Hezron Williams
Assistant Examiner—Andre Allen
(74) Attorney, Agent, or Firm—Joel Voelzke, Esq.; Oppenheimer Wolff & Donnelly LLP

(57) ABSTRACT

The present invention provides a stable differential pressure measurement system. Two micro-machined semiconductive capacitive sensors each has a diaphragm exposed on one side and having a sealed partially evacuated chamber within the sensor on the other side of the diaphragm. A circuit corrects the slope responses and offsets of the capacitive sensor output signals to provide an accurate differential pressure measurement. Sensitive electronics are buried within the sensors and isolated within the sealed housing to protect them from harsh surrounding media. Such harsh surrounding media can be found when the system is used in an automobile exhaust system.

21 Claims, 6 Drawing Sheets

STABLE DIFFERENTIAL PRESSURE MEASURING SYSTEM

BACKGROUND OF THE INVENTION

The invention relates generally to pressure sensors, and more particularly to a differential pressure measuring system.

Differential pressure sensors are used to measure pressure differences between two pressure sensing elements. The invention of the present application uses two pressure-sensing elements. The pressure sensing elements provide outputs proportional to their respective measured pressures. The difference between the outputs represents the differences between the measured pressures. Circuitry combined with the pressure sensing elements corrects the slope and offset characteristics of the output curves to improve pressure-measuring accuracy. For example, U.S. Pat. No. 4,196,382 to Bryzek, U.S. Pat. No. 5,193,393 to Czarnocki and U.S. Pat. No. 5,471,884 to Czarnocki et al. each adjusts the pressure sensing element outputs prior to combining the outputs to produce the differential pressure measurement. However, these references fail to optimize the differential pressure measurements.

One important application for differential pressure sensors is in the automobile industry, where they are used to measure the pressure difference between the engine's exhaust and intake manifolds. In such applications, the sensors are exposed to harsh contaminants. It is desirable to isolate the sensor from the surrounding contaminants while still accurately measuring pressure. U.S. Pat. No. 5,471,884 to Czarnocki et al. describes one attempt to provide a differential pressure sensor isolated from the surrounding media by confirming the media to the insensitive backside surfaces of the piezo-resistive pressure sensor die. However, the Czarnocki circuitry fails to function reliably when the sensitive topside surfaces contact contaminants, causing shunting between the lead-wires and circuits.

SUMMARY OF THE INVENTION

A general object of the present invention is to provide a stable differential pressure measurement system which will protect delicate sensor electronics from harsh surrounding media. Another objective is for the system to provide accurate differential pressure measurements. These goals are achieved by the present invention comprising a first sensor, preferably a micro-machined semiconductive capacitive sensor, including a first diaphragm exposed on one side and having a sealed partially evacuated chamber within the first sensor on the other side of the first diaphragm, the first sensor providing a first sensor signal proportional to the difference between a first pressure applied across the exposed side of the first diaphragm and a second pressure applied across the chamber side of the first diaphragm; a second micro-machined semiconductive capacitive sensor including a second diaphragm exposed on one side and having a second sealed partially evacuated chamber within the second sensor on the other side of the second diaphragm, the second sensor providing a second sensor signal proportional to the difference between a third pressure applied across the exposed side of the second diaphragm and a fourth pressure applied across the chamber side of the second diaphragm, and circuitry for combining the first and second sensor signals to produce a differential-pressure output signal.

The invention also includes the method for performing a differential pressure measurement comprising the steps of: transporting a first fluid through a first intake to exert a first force on a first mass of gel, the gel transferring the force to a first sensor, preferably a micro-machined semiconductive capacitive sensor; transporting a second fluid through a second intake to exert a second force on a second mass of gel, the gel transferring the force to a second micro-machined semiconductive capacitive sensor; producing, from the first and second capacitive sensors, first and second sensor signals proportional to the first and second forces exerted on the first and second capacitive sensors; and combining the first and second output signals to produce a differential-pressure output signal.

The invention can be used in an exhaust system for an engine comprising exhaust and intake manifolds; first and second nozzles; a first and second conduits connecting the first nozzle to the exhaust manifold and the second nozzle to the intake manifold; a first sensor, preferably a micro-machined semiconductive capacitive sensor, including a first diaphragm exposed on one side to the exhaust manifold and having a sealed partially evacuated chamber within the first sensor on the other side of the first diaphragm, the first sensor providing a first sensor signal proportional to the difference between a first pressure applied across the exposed side of the first diaphragm and a second pressure applied across the chamber side of the first diaphragm; a second micro-machined semiconductive capacitive sensor including a second diaphragm exposed on one side to the intake manifold and having a second sealed partially evacuated chamber within the second sensor on the other side of the second diaphragm, the second sensor providing a second sensor signal proportional to the difference between a third pressure applied across the exposed side of the second diaphragm and a fourth pressure applied across the chamber side of the second diaphragm; a circuitry for combining the first and second signals to produce a differential-produce output signal representing the differential pressure between the exhaust and intake manifolds.

These objects as well as other objects, features and advantages of the invention will become more apparent to those skilled in the art from the following description with reference to the accompanying drawings.

BRIEF DESCRIPTION OF THE DRAWINGS

Detailed description of the preferred embodiment of the invention will be made with reference to the accompany drawings.

DETAILED DESCRIPTION OF THE PREFERRED EMBODIMENTS

Disclosed herein is a detailed description of some of the best presently known modes of carrying out the invention. This description is not to be taken in a limiting sense, but is made merely for the purpose of illustrating the general principles of the invention. The overall organization of the present detailed description is for the purpose of convenience only and is not intended to limit the present invention.

Figure 1:
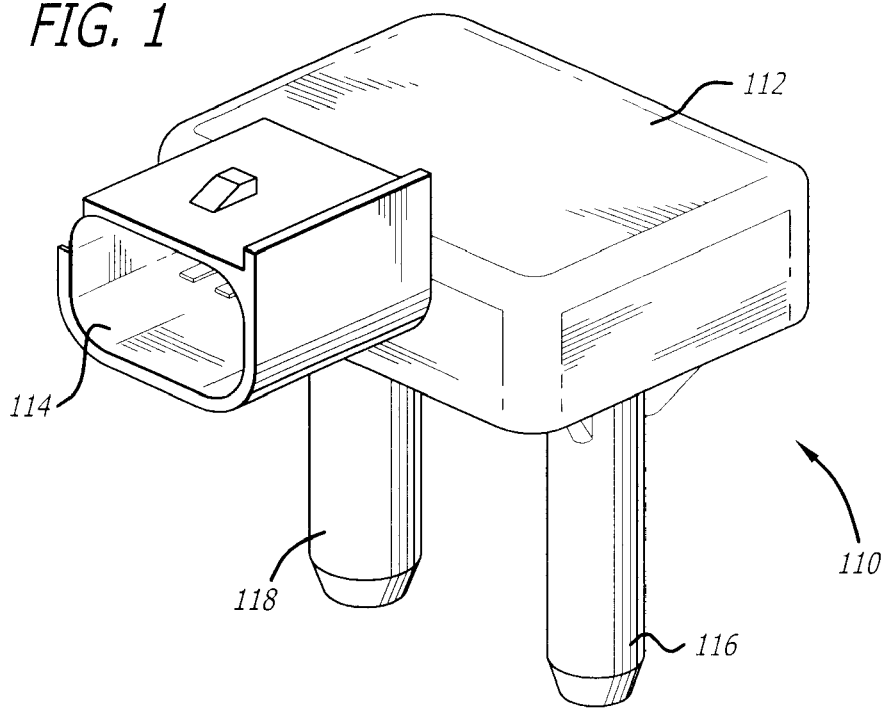
FIG. 1 is a perspective view of the stable differential pressure measuring system of the present invention.

FIG. 1 is a perspective view of the stable differential pressure measuring system 110 of the present invention. The system 110 is enclosed in a housing 112. Electrical connections to the system are made through an opening formed by walls 114. The system has a high-pressure intake 116 and a low-pressure intake 118 extending outwardly from the housing. The intakes 116, 118 can be nozzles as illustrated in FIG. 1, or other suitable intake structures.

Figure 8:
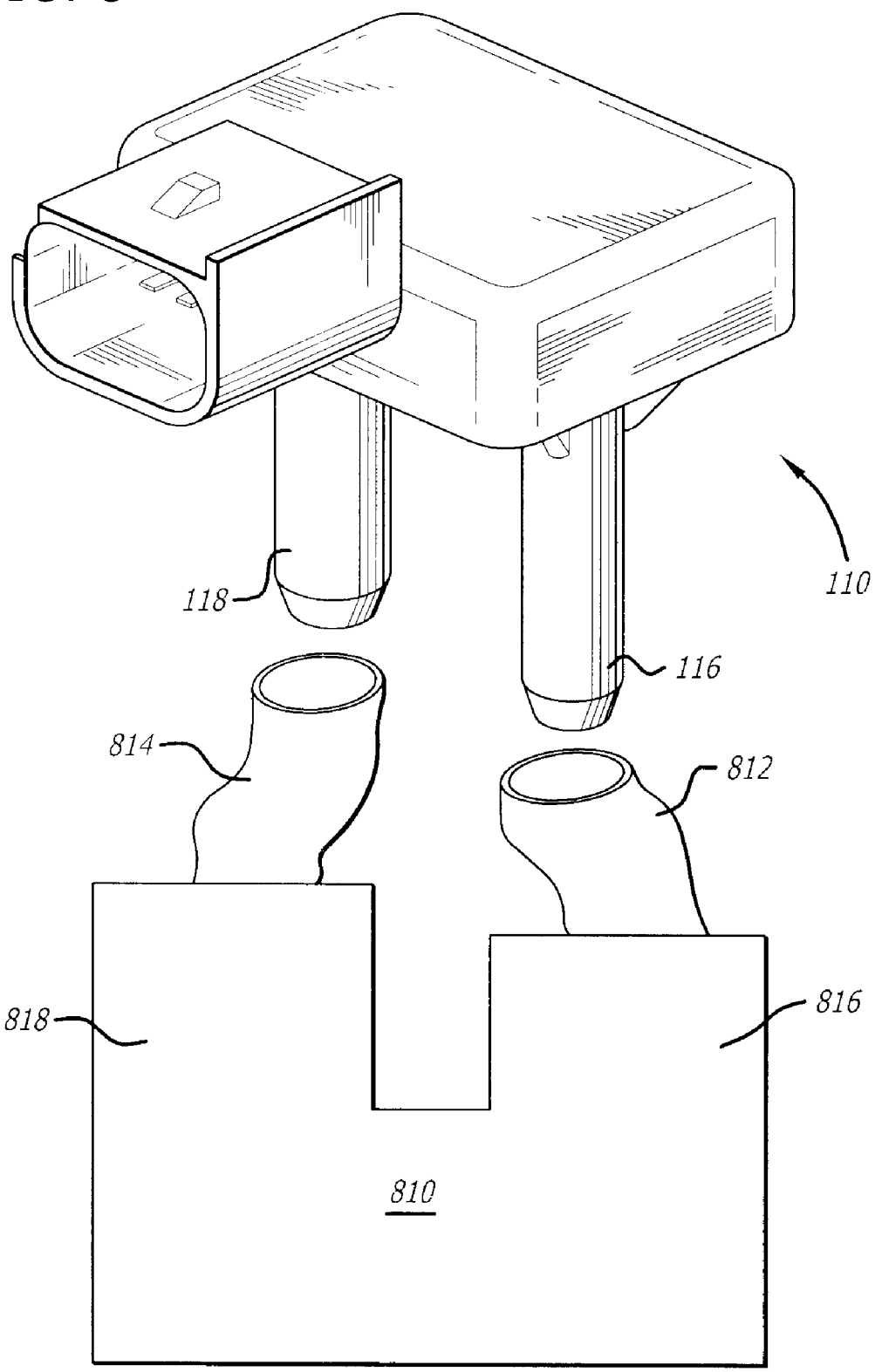
FIG. 8 is a semi-diagrammatic perspective view of an engine exhaust system using the stable differential pressure measuring system of the present invention.

In one application, illustrated in FIG. 8, the differential pressure measuring system 110 is used in an automobile engine for measuring differential pressure in the exhaust system 810. The high pressure intake 116 can be connected via a hose or conduit 812 (FIG. 8) to measure the pressure at the engine's exhaust manifold 816 while the low pressure intake 118 can be connected via a conduit 814 to measure the pressure at the engine's intake manifold 818. The exhaust manifold 816 typically provides a pressure of between 0–19 psi to the high-pressure intake 116 while the intake manifold 118 typically provides a pressure of between 0–15 psi to the low-pressure intake 118. This measurement is necessary for the exhaust gas recirculation valve (EGR).

Figure 2:
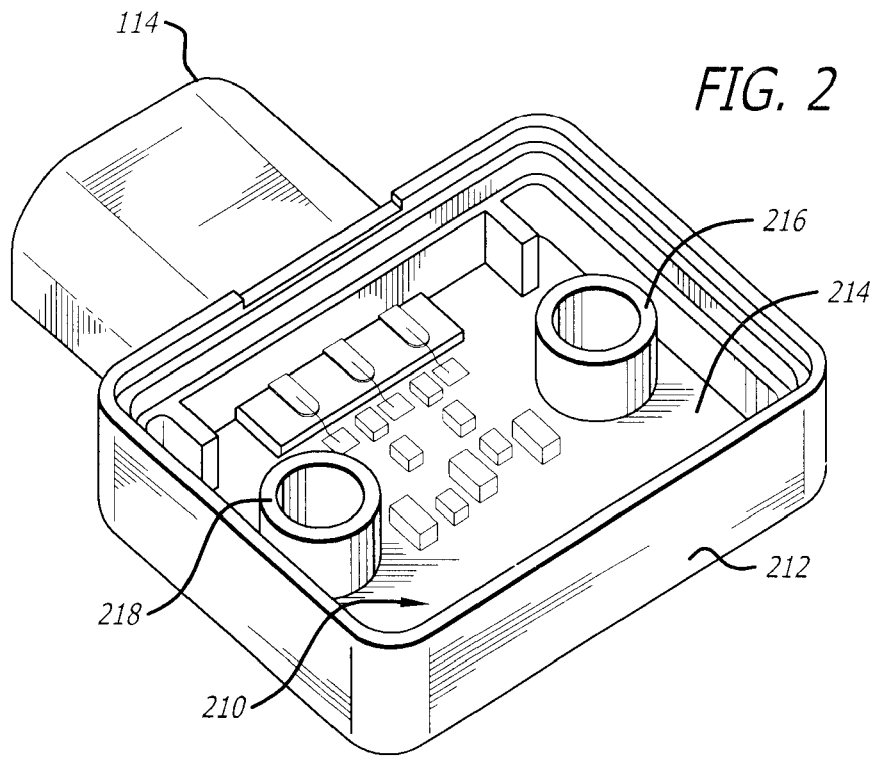
FIG. 2 is a perspective view of the hybrid assembly resting in a portion of the housing.

FIG. 2 is a perspective view of a hybrid assembly 210 resting in a top portion 212 of the housing 112. The hybrid assembly 210 can be arranged on a ceramic substrate 214. Chimneys 216, 218 are bonded to the substrate 214 to form a substantially fluid-tight connection. The chimneys are preferably ceramic, but can be made of other materials as well. The chimneys 216, 218 can be substantially cylindrical as illustrated in FIG. 2, or can have other shapes.

Figure 3:
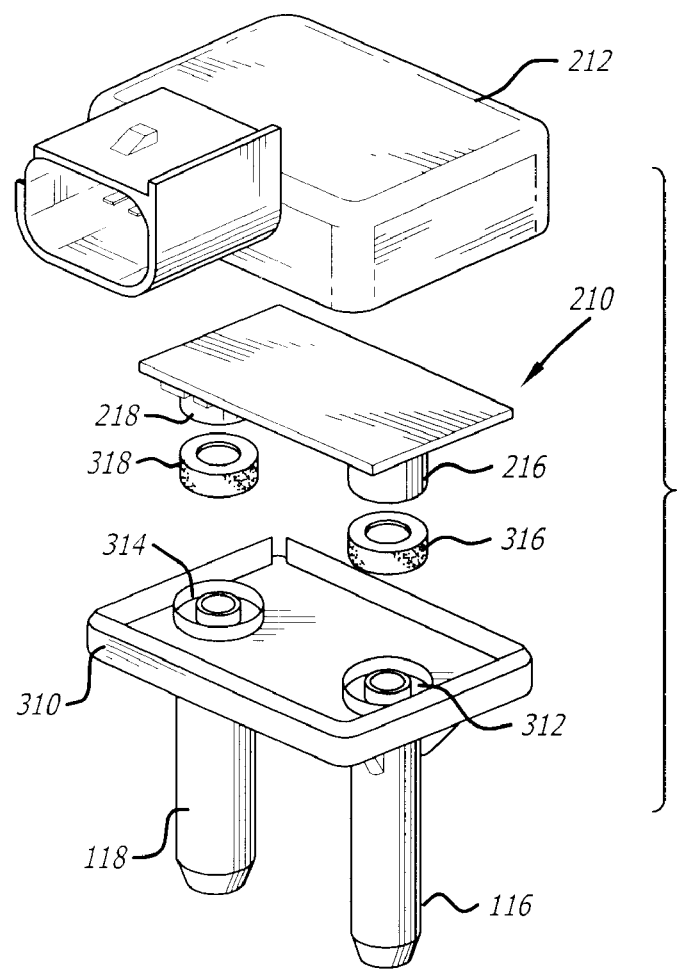
FIG. 3 is an exploded perspective view of the stable differential pressure measuring system of FIG. 1.

FIG. 3 is an exploded perspective view of the differential pressure measuring system 110. Formed in a lower housing portion 310 are grooves 312, 314. Gaskets 316, 318 fit between the chimneys 216, 218 and the grooves 312, 314 to form a substantially fluid-tight seal between the chimneys 216, 218 and the intakes 116, 118. The hybrid assembly 210 is secured to the top portion of the housing 212 and the top portion of the housing 212 is sealed to the lower housing portion 310 to provide a substantially fluid-tight connection. In the present application, fluid-tight is used to mean substantially impermeable by a fluid. In some applications the fluid is a gas while in others the fluid is a liquid.

Thus, in the assembled housing 112, the space within the chimneys 216, 218 is open to the outside of the housing 112, while the parts of the hybrid assembly 210 outside the chimneys 216, 218 are sealed within the housing 112, isolated from the surroundings.

Figure 4:
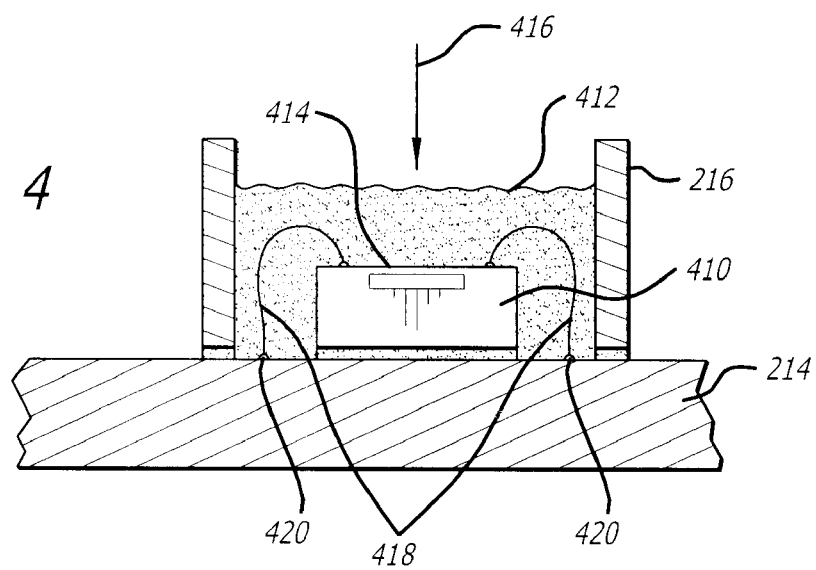
FIG. 4 is a semi-diagrammatic cross-sectional view of a portion of the hybrid assembly and showing a chimney surrounding an InCap sensor and filled with gel.

FIG. 4 is a semi-diagrammatic cross-sectional view of a portion of the hybrid assembly 210 showing one of the chimneys 216 with an Integrated Capacitor Sensor and Electronics ("InCap") sensor 410 mounted inside and surrounded by gel 412. Here "gel" is defined as a colloidal suspension of a liquid in a solid, forming a jellylike material in a more solid form than a solution. The gel is specially selected to accurately transmit pressure while isolating the InCap electronics from harsh surrounding conditions. The gel can be, for example, Shin-Etsu, which stays soft over the −40 Celsius to 135 Celsius temperature range and does not exert extra pressure on the InCap sensor. In some applications, for example when relatively clean gas is being measured for pressure, or when the pressure measuring system is to be used only temporarily and then discarded, the gel can be disposed of and the InCap sensor can be exposed directly to the gas rather than being exposed to the gas through the gel. The other chimney 218 has an InCap sensor similarly situated. Wirebonds 418 electrically connect the InCap sensors 410, 411 to traces 420 on the substrate 214 and carry a relatively high voltage. The InCap sensor illustrated in FIG. 4 is not drawing to scale. A partially evacuated chamber 414 is drawn to a greatly exaggerated scale relative to the InCap sensor 410. The partially evacuated chamber 414 typically has a pressure of between 0–½ psi.

In automobile exhaust applications, the ambient air can be very dirty and can quickly degrade electronics. Unlike differential pressure sensors of the prior art, in the system of the present invention all delicate electronics are protected from the ambient air. The gel 412 protects the InCap sensors 410, 411. Further, the delicate electronics are buried within the InCap sensors. Other electronics are protected inside the fluid tight sealed portion of the housing 112.

Figure 5:
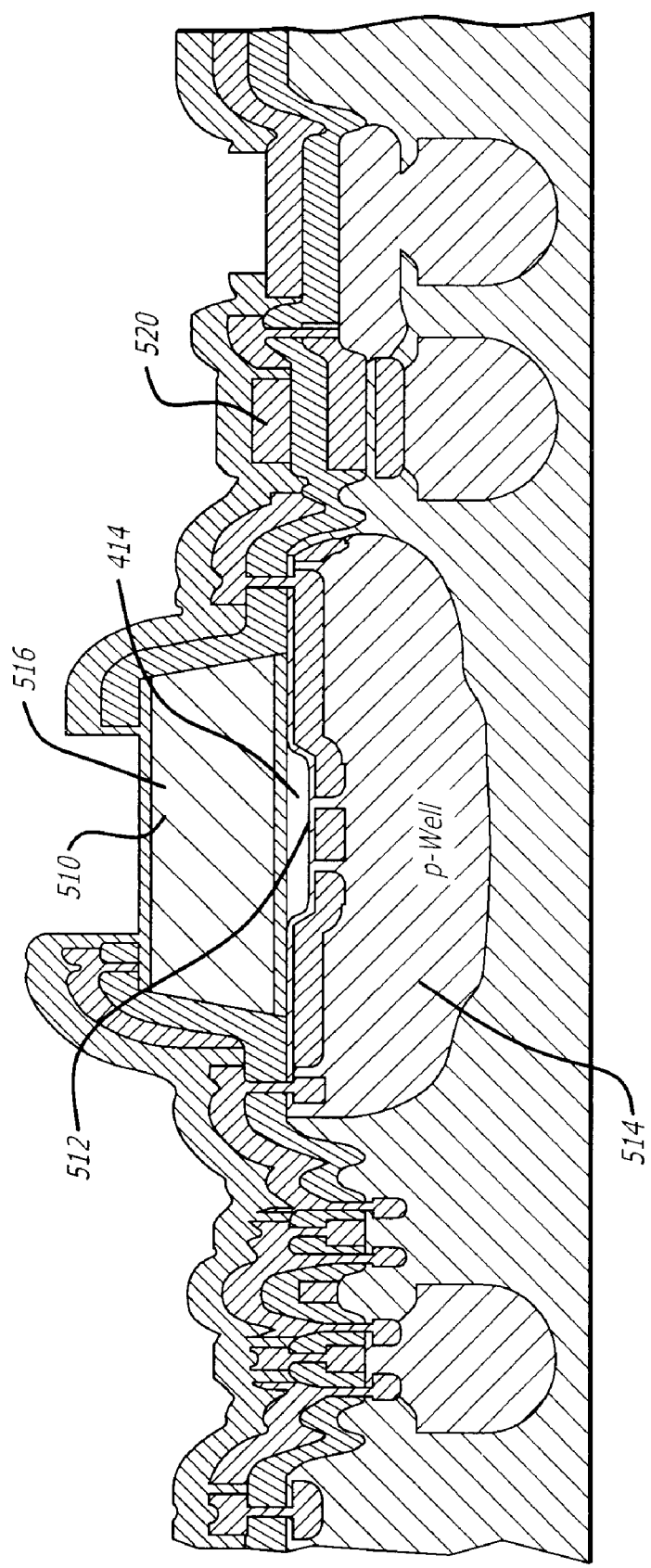
FIG. 5 is a diagrammatic cross-sectional view, not to scale, of the InCap sensor of FIG. 4.
Figure 6:
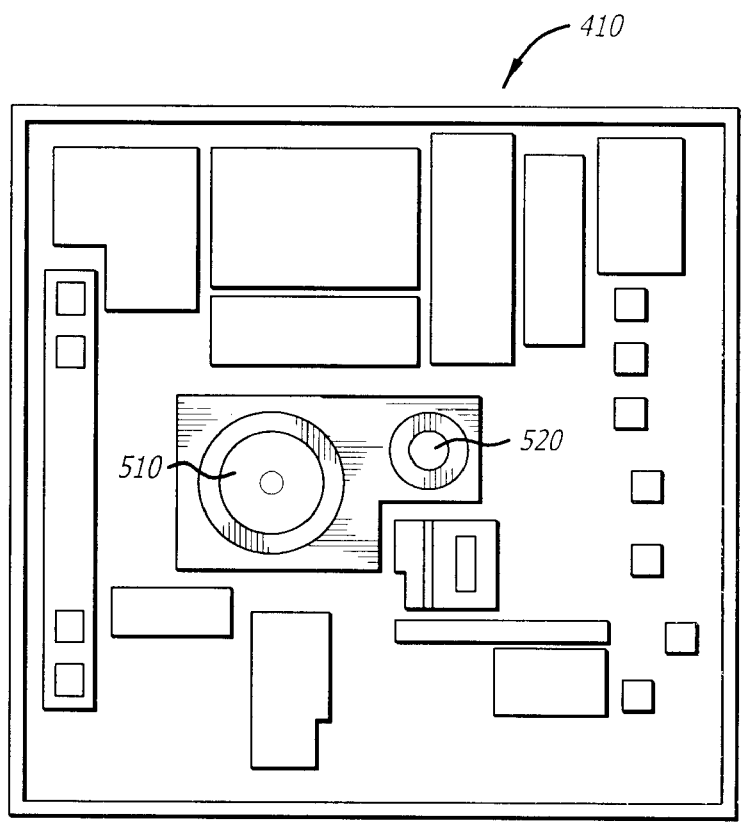
FIG. 6 is a semi-diagrammatic top plan view of the InCap sensor of FIG. 4.

FIG. 5 is a diagrammatic cross-sectional view and FIG. 6 is a semi-diagrammatic top plan view of the InCap sensor 410 of FIG. 4. The InCap sensor is fabricated using Single Crystal Surface Micromachining ("SCSM") technology. SCSM shapes a silicon wafer for fusion bonding during building of semiconductor structures such as capacitors having flexible membranes. Such structures can operate as miniature pressure sensors and are integrable with standard MOS (metal oxide semiconductor) devices. U.S. Pat. No. 6,008,113. U.S. Pat. No. 5,966,617, U.S. Pat. No. 5,929,498, U.S. Pat. No. 5,923,952, U.S. Pat. No. 5,578,843, and U.S. Pat. No. 5,576,251 all describe such sensors and are incorporated by reference herein in their entirety. The InCap sensor illustrated in FIG. 6 is approximately ⅒ inch on each side. Formed on the InCap sensor is a Micromachined Silicon Capacitive Sensor ("MMSCS") or sense capacitor 510 for measuring pressure 416 transmitted by the gel 412. The sense capacitor 510 is formed by a flexible membrane 516 bonded to a semiconductor substrate to form the partially evacuated chamber 414. A bottom capacitor plate 512 is formed at the top of a p-well diffusion area 514. The MMSCS typically has a 1–4 volt output voltage only up to approximately 100 mV for piezo-resistive sensors.

Returning to FIG. 4, the pressure 416 is transferred by the gel 412 to the flexible membrane 516, flexing the membrane. The deflection of the membrane also depends on the pressure difference between the partially evacuated chamber and the exposed side of the membrane. Changing the size and shape of the cavity changes the value of the capacitance between the membrane 516 and the bottom capacitor plate 512. The value of the capacitance is used to determine the pressure exerted on the sense capacitor 510.

Also shown in the FIGS. 5 and 6 is an analog or reference capacitor 520 which produces an output voltage independent of pressure. The InCap sensor 411 is similar to the InCap sensor 411 has a partially evacuated chamber similar to chamber 414 illustrated in FIG. 4. Thus, FIG. 4 can be used to illustrate InCap sensor 411 in addition to InCap sensor 410. The pressures inside the two chambers are typically not the same.

Figure 7:
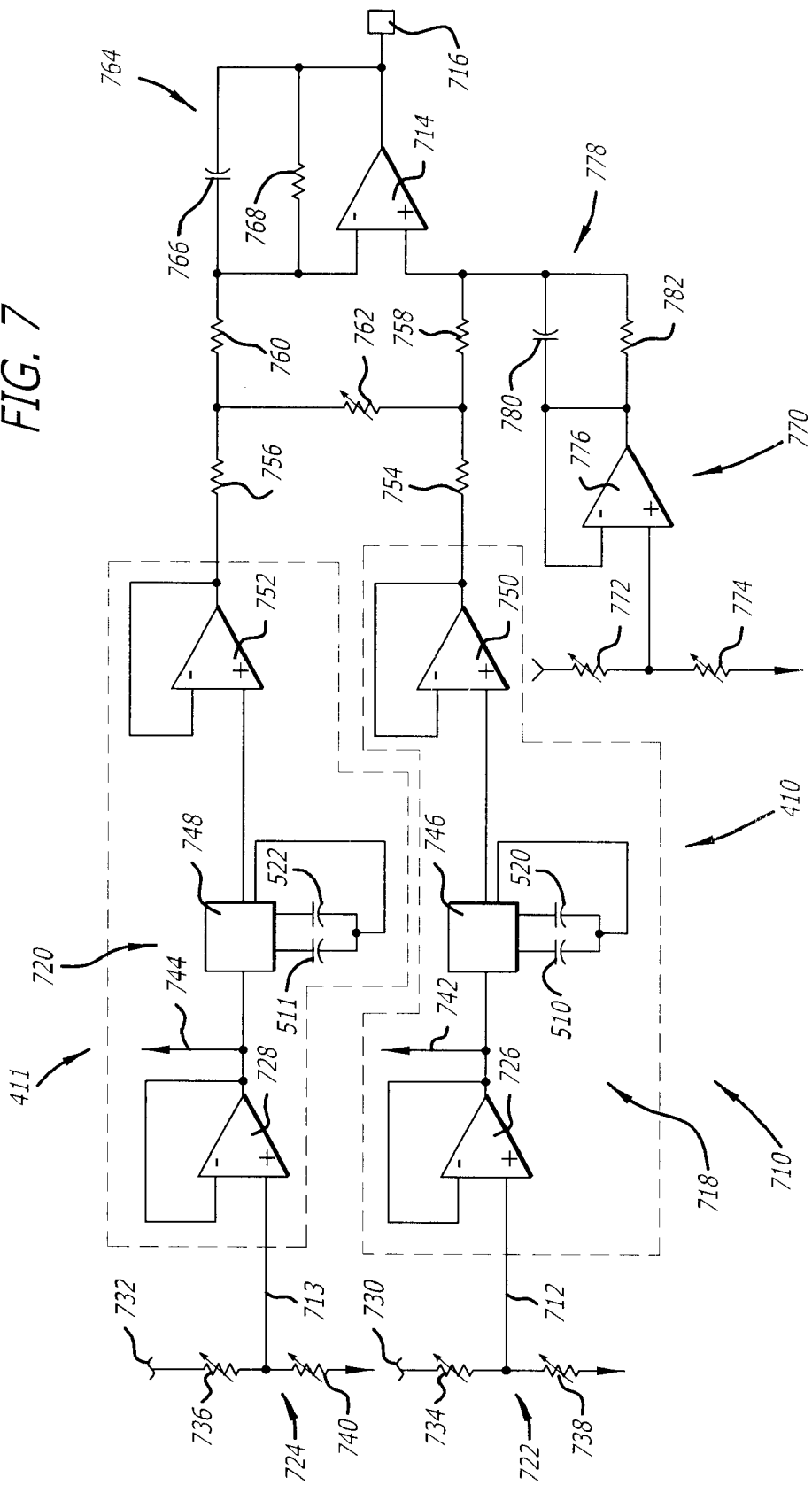
FIG. 7 is a schematic circuit diagram of electronics used in the stable differential pressure measuring system.

FIG. 7 is a schematic circuit diagram of electronics 710 used in the differential pressure measuring system 110. The circuit has a high pressure measuring path 712, for measuring the pressure from the intake 116, and a reference measuring path or low pressure measuring path 713, for measuring the pressure from the intake 118. These paths lead to a differential amplifier 714 which outputs a differential pressure output signal 716.

The sense capacitors 510, 511 can have very different slope and offset characteristics compared to each other. However, the electronics 710 adjust the slope and offset characteristics to substantially match and thus provide an accurate differential pressure measurement.

In one embodiment, a high pressure circuit section 718 and reference circuit section 720 are fabricated on separate InCap sensor chips, 410 and 411 (identified in the figure by dashed lines), respectively, while other portions of the circuit are distributed on the ceramic substrate 214. The InCap sensor 410 is mounted within the chimney 216 while the InCap sensor 411 is mounted within the chimney 218. The traces 420 run along the surface of the ceramic substrate 214 to electrically connect the InCap sensors 410, 411 to the rest of the circuit schematically illustrated in FIG. 7. The chimneys can be mounted with a fluid-tight connection over the traces 420 so that the insides of the chimneys are electrically connected to the fluid tight sealed portion of the housing 112, yet fluidly isolated.

Voltage dividers 722, 724 provide input voltages to the positive inputs of reference voltage buffers 726, 724 provide input voltages to the positive inputs of buffers 726, 728. In the illustrated example, the voltage dividers 722, 724 divide 5-volt supply voltages 730, 732 between adjustable resistors 734, 736, 738, 740. The variable resistors 738, 740 can, for example, be varied over a range from 28.8 k-ohms to 50 k-ohms, while the variable resistors 734, 736 can be varied over a range from 5 k-ohms to 20 k-ohms. The voltage buffers 726, 728 provide approximately 4-volts DC reference voltages 742, 744 to conditioners 746, 748.

Figure 9:
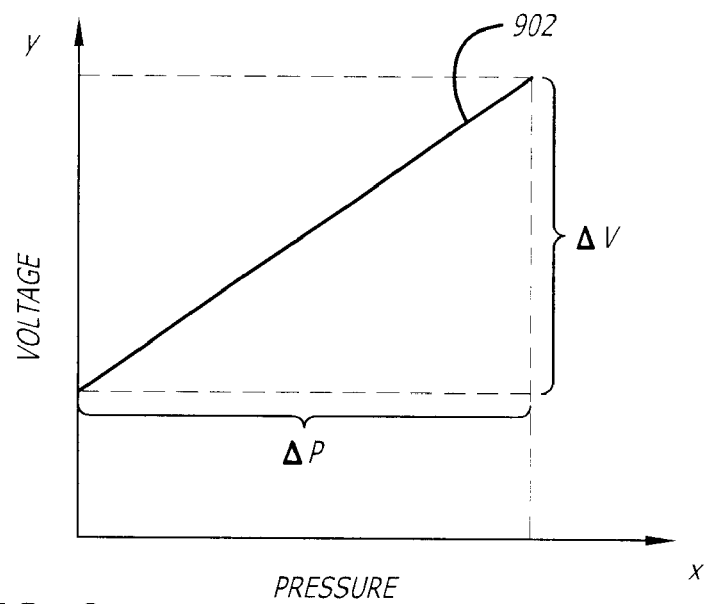
FIG. 9 is a curve representing the voltage output from the sense capacitor as a function of pressure, and showing the slope response.

The sense capacitors 510, 511 and reference capacitors 520, 522 also provide signals to the conditioners 746, 748. Responsive to a pressure span, the sense capacitors provide sensor signals having different slop responses. FIG. 9 illustrates a slope response of the sense capacitors. The conditioners 746, 748 make use of oscillators (not shown) and provide excitation and rectification of the input signals. The magnitudes of the sense capacitors' output signals change with pressure while the magnitudes of the reference capacitor output signals do not change. Each conditioner's output is proportional to the ratio of the sense capacitance and reference capacitance output signals. Because the sense capacitors 510, 511 and reference capacitors 520, 522 experience the same conditions, but only the sense capacitors produce a pressure-varying signal the reference capacitors provide compensation for effects such as temperature changes. Thus, the conditioners 746, 748 produce nearly linear outputs proportional to the pressures applied to the sense capacitors 510, 511 and relatively independent of temperature changes. The conditioner 746, 748 outputs can range from approximately 1.8 volts to 2.8 volts, for example.

The conditioners 746, 748 combine the DC reference voltages 724, 744 with the capacitor outputs to provide conditioner outputs with substantially optimized output versus pressure-curve slopes. Adjusting the values of the resistors 736, 740 adjusts the reference voltage 744. This ratiometrically adjusts the span of the conditioner 748 output. Similarly, adjusting the value of the resistors 734, 738 adjusts the reference voltage 742. This ratiometrically adjusts the span of the conditioner 746 output. Here, span is the difference between the pressure measurement at the minimum pressure and at the full-scale pressure. Increasing the reference voltages 742, 744 increases the span and the slope of the conditioners outputs. The resistors are adjusted until the output slopes substantially match a desired standard slope.

The resistors 734, 736, 738, 740 can be thick-film printed on the ceramic hybrid substrate. These resistors are adjusted by laser trimming. Alternatively, the resistors may be thin-film or may be discrete trimmable chip resistor, also adjusted using laser trimming. The resistors are adjusted until the conditioner outputs substantially match an optimally chosen standard slope.

The conditioner 746, 748 outputs then pass through voltage buffers 750, 752 and then pass through resistors 754, 756, 758, 760. Operational amplifiers can also serve as the voltage buffers 750, 752 and the resistors 754, 756, 758, 760 can have values of 10 k-ohms with tolerances of +/− 0.5%. A resistor 762 provides gain adjustment and can be adjusted to have a value of, for example 10 k-ohms to 70 k-ohms. The resistor 762 can be of the types described with reference to the adjustable resistors 734, 736, 738, 740 above.

A time response control circuit portion 764 is connected in parallel with the amplifier 714 negative input. The time response control circuit portion 764 includes a capacitor 766 in parallel with a resistor 768. The capacitor can have a value of 0.22 microfarads with a tolerance of +/− 10% and the resistor can have a value of 562 k-ohms with a tolerance of +/− 1%. The time constant of the capacitor-resistor combination is designed to integrate and delete pressure noise pulsations.

An offset correction portion 770 is connected in series with the amplifier 714 positive input. The offset correction portion 770 corrects the relative offset of the conditioner output versus pressure-curve slopes for the high and reference pressure measuring paths 712, 713. The offset correction portion includes a voltage divider made up of variable resistors 772, 774, an operational amplifier 776, and a filtering circuit portion 778. The filtering circuit portion 778 includes a capacitor 780 in parallel with a resistor 782. The values of the capacitor 780 and resistor 782 can be similar to those used in the time response control circuit portion 764. The variable resistor 772 can, for example, have a range of resistance values from 40 k-ohms to 75 k-ohms, while the variable resistor 774 can have a range of resistance values from 8 k-ohms, to 36 k-ohms. The variable resistors can be of the types described above in reference to variable resistors 734, 736, 738, 740. The variable resistors 772, 774 are adjusted to adjust the voltage supplied by the offset correction portion 770. The sense capacitors 510, 511 only have an approximate temperature error of 1–2%, but if needed the circuit can be modified to provide additional temperature offset correction.

The importance of slope and offset correction in the differential pressure sensor can be illustrated as follows. The equation of the voltage versus pressure curve fed into the positive differential amplifier 714 input is:

$$V_1 = v_1 + m_1 P_1$$

$V_1$ is the high pressure measuring path 712 voltage fed into the positive differential amplifier 714 input, $P_1$ is pressure to be measured, $b_1$ is the offset voltage and $m_1$ is the slope. The equation of the voltage versus pressure curve fed into the negative differential amplifier 714 input is:

$$V_2 = b_2 + m_2 P_2$$

where $V_2$ is the reference measuring path 713 voltage fed into the negative differential amplifier 714 input, $P_1$ is the high pressure and $P_2$ is the reference pressure to be measured, $b_2$ is the offset voltage and $m_2$ is the slope. The resulting differential output 716 from the differential amplifier 714 is then:

$$V_1-V_2=(b_1-b_2)+(m_1P_1-m_2P_2)$$

If the slopes are adjusted to match and the offsets are corrected then the equation simplifies to:

$$V_1-V_2-m(P_1-P_2)$$

Thus, the differential amplifier's differential voltage output is directly proportional to the difference between the high pressure and the reference pressure.

The above-cited voltage, resistance and capacitance values are intended as an illustrative example only. Other values can also be used as determined by one skilled in the art. Also, additional sensors, can be added and differential measurements from various combinations of the sensors can be taken. Some of the additional sensors can be together while others are isolated from each other in separate chimneys or otherwise. Further, the invention is not intended to be limited to the measurement of intake and exhaust gases only, but can be used to measure the pressure of other fluids, for example, other gasses or liquids. Additionally, the InCap sensors are not limited to any particular semiconductor material. For example, diamond can be used rather than silicon. Accordingly, the invention is not limited to the precise embodiment described in detail hereinbefore.

We claim:

1. A stable differential pressure measurement system comprising:

a first micro-machined semiconductive capacitive sensor including a first diaphragm exposed on one side and having a sealed partially evacuated chamber within the first sensor on the other side of the first diaphragm, said first sensor signal proportional to the difference between a first pressure applied across the exposed side of the first diaphragm and a second pressure applied across the chamber side of the first diaphragm;

a second micro-machined semiconductive capacitive sensor including a second diaphragm exposed on one side and having a second sealed partially evacuated chamber within the second sensor on the other side of the second diaphragm, said second sensor providing a second sensor signal proportional to the difference between a third pressure applied across the exposed side of the second diaphragm and a fourth pressure applied across the chamber side of the second diaphragm; and circuitry for receiving the first and second sensor signals and producing a differential-pressure output signal.

2. A system as defined in claim 1 wherein the first and second partially evacuated chambers have different pressures.

3. A system as defined in claim 1, further comprising:

a first substrate section;

a second substrate section;

a first chimney;

a second chimney;

and wherein:

the first sensor is fixed relative to the first substrate section and is within the first chimney having a substantially fluid-tight attachment to the first substrate section; and the second sensor is fixed relative to the second substrate section and is within the second chimney having a substantially fluid-tight attachment to the second substrate section.

4. A system as defined in claim 3 wherein:

the first sensor is surrounded by the first substrate section and a first mass of gel; and the second sensor is surrounded by the second substrate section and a second mass of gel.

5. A system as defined in claim 3 further comprising:

a housing;

first and second intakes;

wherein the first intake structurally cooperates with the first chimney to form a substantially fluid-tight path between the first intake and the first chimney such that a first fluid path exists from the first intake to the first chimney, and the second intake structurally cooperates with the second chimney to form a substantially fluid-tight path between the second intake and the second chimney such that a second fluid path exists from the second intake to the second chimney; and wherein the first and second chimneys form a substantially fluid-take space within the housing.

6. A system as defined in claim 5 wherein:

the circuitry for combining the first and second signals to produce the differential pressure output signal is located within the substantially fluid-tight space within the housing and is electrically connected to the first and second capacitive sensors.

7. A system as defined in claim 3 wherein:

a first reference capacitor having a capacitance substantially independent of pressure is within the first chimney and is electrically connected to the first sensor; and a second reference capacitor having a capacitance substantially independent of pressure is within the second chimney and is electrically connected to the second sensor.

8. A system as defined in claim 7 further comprising:

a first integrated circuit;

a second integrated circuit;

and wherein:

the first sensor and first reference capacitor are formed on a first integrated circuit within the first chimney; and the second sensor and second reference capacitor are formed on a second integrated circuit within the first chimney.

9. A system as defined in claim 5 wherein, responsive to a pressure span, the first sensor signal responds with a slope response different than a slope response of the second sensor signal;

the system including:

circuitry for adjusting the slope responses of the first and second sensor signals to corresponds to a standard slope and providing slope adjusted first and second signals dependent on the adjusted slope responses; and wherein the output signal is dependent on a difference between the slope adjusted first signal and the slope adjusted second signal.

10. A system as defined in claim 9 further comprising:

offset circuitry for providing an offset signal, and wherein the output signal depends on the offset signal.

11. A system as defined in claim 9 wherein the circuitry for adjusting other increases or decreases the slope responses of the first and second sensor signals to correspond.

12. A system as defined in claim 1 wherein, responsive to a pressure span, the first sensor signal responds with a slope response difference than a slope response of the second sensor signal;

the system including:
first and second conditioners;
first and second adjustable reference voltage sources electrically connected to the first and second conditioners, respectively, for providing first and second reference voltages to the first and second conditioners, respectively;
wherein the circuitry for combining the first and second signals to produce a differential-pressure output signal includes a differential amplifier;
wherein the conditioners adjust the slope responses of the first and second sensor signals, according to the reference voltages, to correspond to a standard slope and provides adjusted first and second slope responses to the positive and negative inputs of the differential amplifier; and
wherein the differential amplifier subtracts the first and second signals to produce a differential-pressure output signal.

13. A system as defined in claim 12 further comprising:
an offset adjustment operational amplifier having an output electrically connected to a first input of the differential amplifier for adjusting the relative offsets of the adjusted first and second slope responses;
an offset adjustment reference voltage source electrically connected to the offset adjustment operational amplifier for providing an offset adjustment reference voltage to the offset adjustment operational amplifier for adjusting the amount of offset adjustment.

14. A system as defined in claim 13 further comprising:
a time response control circuit portion electrically connected in to a second input of the differential amplifier.

15. An exhaust system for an engine comprising:
exhaust and intake manifolds;
first and second nozzles;
first and second conduits connecting the first nozzle to the exhaust manifold and the second nozzle to the intake manifold;
a first capacitive sensor including a first diaphragm exposed on one side through the first nozzle and first conduit to the exhaust manifold and having a sealed partially evacuated chamber within the first sensor on the other side of the first diaphragm, said first sensor providing a first sensor signal proportional to the difference between a first pressure applied across the exposed side of the first diaphragm and a second pressure applied across the chamber side of the first diaphragm;
a second capacitive sensor including a second diaphragm exposed on one side through the second nozzle and second conduit to the intake manifold and having a second sealed partially evacuated chamber within the second sensor on the other side of the second diaphragm, said second sensor providing a second sensor signal proportional to the difference between a third pressure applied across the exposed side of the second diaphragm and a fourth pressure applied across the chamber side of the second diaphragm; and
circuitry for receiving the first and second sensor signals and producing a differential pressure output signal representing the differential pressure between the exhaust and intake manifolds.

16. A system as described in claim 15 wherein said sensors are micro-machined semiconductive capacitors.

17. A method for performing a differential pressure measurement comprising the steps of:
transporting a first fluid through a first intake to exert a first force on a first mass of gel, the gel transferring the force to a first micro-machined semiconductive capacitive sensor;
transporting a second fluid through a second intake to exert a second force on a second mass of gel, the gel transferring the force to a second micro-machined semiconductive capacitive sensor;
producing, from said first and second sensors, first and second sensor signals proportional to the first and second forces exerted on the first and second capacitive sensors;
inputting the first sensor signal into a first conditioner;
inputting a first reference voltage into the first conditioner
adjusting the first reference voltage to adjust the slope response of the first sensor output signal to correspond to a standard slope;
inputting the second sensor signal into a second conditioner;
inputting a second reference voltage into the second conditioner;
adjusting the second reference voltage to adjust the slope response of the second sensor signal to correspond to the standard slope; and
combining outputs from the first and second conditioners to produce a differential-pressure output signal.

18. A method for performing a differential pressure measurements as defined in claim 17, further comprising the step of:
adjusting the offset of the first and second slope adjusted sensor signals.

19. A method for performing a differential pressure measurement as defined in claim 17, further comprising the step of:
inputting first and second reference capacitor signals into the first and second conditioners to correct for temperature effects.

20. A stable differential pressure measurement system comprising:
a first sensor including a first diaphragm exposed on one side and having a sealed partially evacuated chamber within the first sensor on the outer side of the first diaphragm, said first sensor providing a first sensor signal proportional to the difference between a first pressure applied across the exposed side of the first diaphragm and a second pressure applied across the chamber side of the first diaphragm;
a second sensor including a second diaphragm exposed on one side and having a second sealed partially evacuated chamber within the second sensor on the other side of the second diaphragm, said second sensor providing a second sensor proportional to the difference between a third pressure applied across the exposed side of the second diaphragm and a fourth pressure applied across the chamber side of the second diaphragm; and
circuitry for receiving and combining the first and second sensor signals to produce a differential-pressure output signal.

21. A system as defined in claim 20, wherein said sensors are capacitive sensors.

* * * * *